United States Patent [19]

Barton

[11] Patent Number: 4,600,415

[45] Date of Patent: Jul. 15, 1986

[54] GAS FILTERING APPARATUS

[75] Inventor: William J. Barton, Wichita, Kans.

[73] Assignee: Kice Metal Products, Inc., Wichita, Kans.

[21] Appl. No.: 704,957

[22] Filed: Feb. 25, 1985

[51] Int. Cl.$^4$ ............................................. B01D 46/04
[52] U.S. Cl. ........................................ 55/294; 55/303; 55/341 R
[58] Field of Search ................ 55/273, 283, 284, 293, 55/294, 302–304, 341 R

[56] References Cited

U.S. PATENT DOCUMENTS

| | | | |
|---|---|---|---|
| 3,277,633 | 10/1966 | Smoot | 55/302 |
| 3,394,532 | 7/1968 | Oetiker | 55/302 |
| 3,457,893 | 7/1969 | Lavalier | 55/302 X |
| 3,487,609 | 1/1970 | Caplan | 55/294 X |
| 3,541,764 | 11/1970 | Astrom | 55/302 |
| 3,616,614 | 11/1971 | Eisenegger | 55/302 X |
| 3,798,878 | 3/1974 | Pausch | 55/302 X |
| 4,022,595 | 5/1977 | Noland | 55/294 X |
| 4,157,899 | 6/1979 | Wheaton | 55/294 X |
| 4,233,041 | 11/1980 | Noland | 55/294 X |
| 4,247,310 | 1/1981 | Borst | 55/303 X |
| 4,468,240 | 8/1984 | Margraf | 55/294 |
| 4,509,960 | 4/1985 | Engel | 55/294 X |

Primary Examiner—Robert Spitzer
Attorney, Agent, or Firm—Edward L. Brown, Jr.

[57] ABSTRACT

The present invention is directed to dust filtering apparatus comprising a cylindrical housing separated by a horizontal partition into dirty and clean air chambers with a plurality of radially spaced bags attached to the partition hanging in the dirty air chamber; positioned in the clean air chamber is a rotating cleaning arm supplied by a source of high pressure air including a nozzle means positioned to direct a high velocity jet of air into the bag openings in the partition through a venturi means attached to the rotating arm in spaced alignment from the nozzle means whereby the high velocity jet passing through the venturi entrains additional air momentarily into the individual bag being back-washed, and a closure plate on the arm concentrically aligned with the venturi and nozzle to momentarily retain the entrained air within the bag opening.

10 Claims, 5 Drawing Figures

GAS FILTERING APPARATUS

BACKGROUND OF THE INVENTION

The invention relates to improvements in self-cleaning apparatus for dust filters comprising a plurality of porous fabric filter bags radially spaced in a cylindrical baghouse. The baghouse includes a sheet metal housing divided into two chambers referred to as plenums, by a tube sheet which support the plurality of vertically arranged bags. A dust-laden flow of air is introduced by fan into the dirty air plenum where the dust accumulates on the surface of the bags as the air passes through the bag fabric to the clean air plenum. Continuous filtration causes a cake of dust to build on the bags which unless removed will eventually block in air flow through the filter.

During the filtering operation, each of the bags is periodically back-washed by the application of a burst of clean air in the reverse direction through the bag to cause the accumulated dust particles and solids to be dislodged from the bag surface. The dust cake then falls to the cone shaped bottom of the dirty air plenum for subsequent removal. While there are numerous types of filtering systems on the market including wet scrubbers, cyclonic or electric precepitators; the preferred type is fabric filtration since it provides higher collection efficiencies and a relatively easy means for cleaning the filter medium.

Bag filters with various reverse flow air cleaning systems have been utilized in the marketplace for many years. The concept of a rotating sweeping arm, which back flushes individual filter bags has likewise been available for some time as exemplified by the patent to Caplan, U.S. Pat. No. 3,487,609 and the patent to Noland, U.S. Pat. No. 4,233,041. Most bag filters on the market utilize low pressure (3 to 5 PSI) air for the backwashing cycle such as the above-mentioned patent to Noland. However, distinct advantages have been discovered with the usage of high pressure air for the backwash circuit as exemplified in the patents to Pausch, U.S. Pat. No. 3,798,878, Borst, U.S. Pat. No. 4,247,310 and Caplan, U.S. Pat. No. 3,487,609. The last-mentioned reference to Caplan teaches a system that utilizes both low pressure reverse flow air in the cleaning cycle along with a high pressure blast creating a momentary shock wave in the bag. The patent to Borst generally teaches the concept of a high pressure jet which entrains outside air. The patent to Pausch teaches the concept of utilizing a venturi in conjunction with a high pressure blast to increase the amount of entrained air drawn into the bag in conjunction with the high velocity stream. However, this last-mentioned patent has a distinct drawback from the design of the present invention, in that substantial back pressure is always present on each of the bags in the filtering cycle by reason of the restricted flow path through the fixed venturis at the end of each bag.

The present invention has rectified this back pressure problem which severely limits the filter's capacity by providing a single moving venturi which momentarily passes over a filter bag and while blocking the normal filtering flow through the bag, inflating the bag with a sudden blow through the bag, inflating the bag with a sudden blast of compressed air. The partially collapsed bag over the cage momentarily expands to its maximum size causing the layer of dust cake adhering to the external surface of the bag to be released and dropped to the bottom of the baghouse for removal.

The main problem with low pressure filters, such as Noland mentioned above, is that the cleaning air is compressed only a slight amount and consequently there is very little shock effect by the reverse flow air through the bag and therefore the amount of dust removed is nowhere near that achieved with a blast of high pressure air.

With the use of a venturi, applicant has obtained an optimum utilization of this high velocity stream by entraining the stationary air surrounding the stream and drawing it through the venturi into the interior of the bag. At the same time the bag opening is otherwise covered by the closure plate so as to retain the air within the bag to maximize the shock effect. The utilization of a venturi in conjunction with a high velocity jet substantially increases the amount of air transmitted into the bag over prior art systems without a venturi. The present invention thereby obtains the same degree of cleaning at a reduced energy cost.

It is therefore the principal object of the present invention to provide a new and improved rotating arm high pressure cleaning system which utilizes a movable venturi in conjunction with the rotating arm.

Another object of the present invention is to provide a rotating arm cleaning system which is mechanically sequenced and operated.

A further object of the present invention is to provide an efficient rotating arm cleaning system which operates on high pressure plant air.

These and other objects and advantages of the invention will be apparent to those skilled in the art, after a consideration of the following detailed description, taken in conjunction with the accompanying drawings in which the preferred form of this invention is illustrated.

DESCRIPTION OF THE PREFERRED EMBODIMENT

Figure 5:
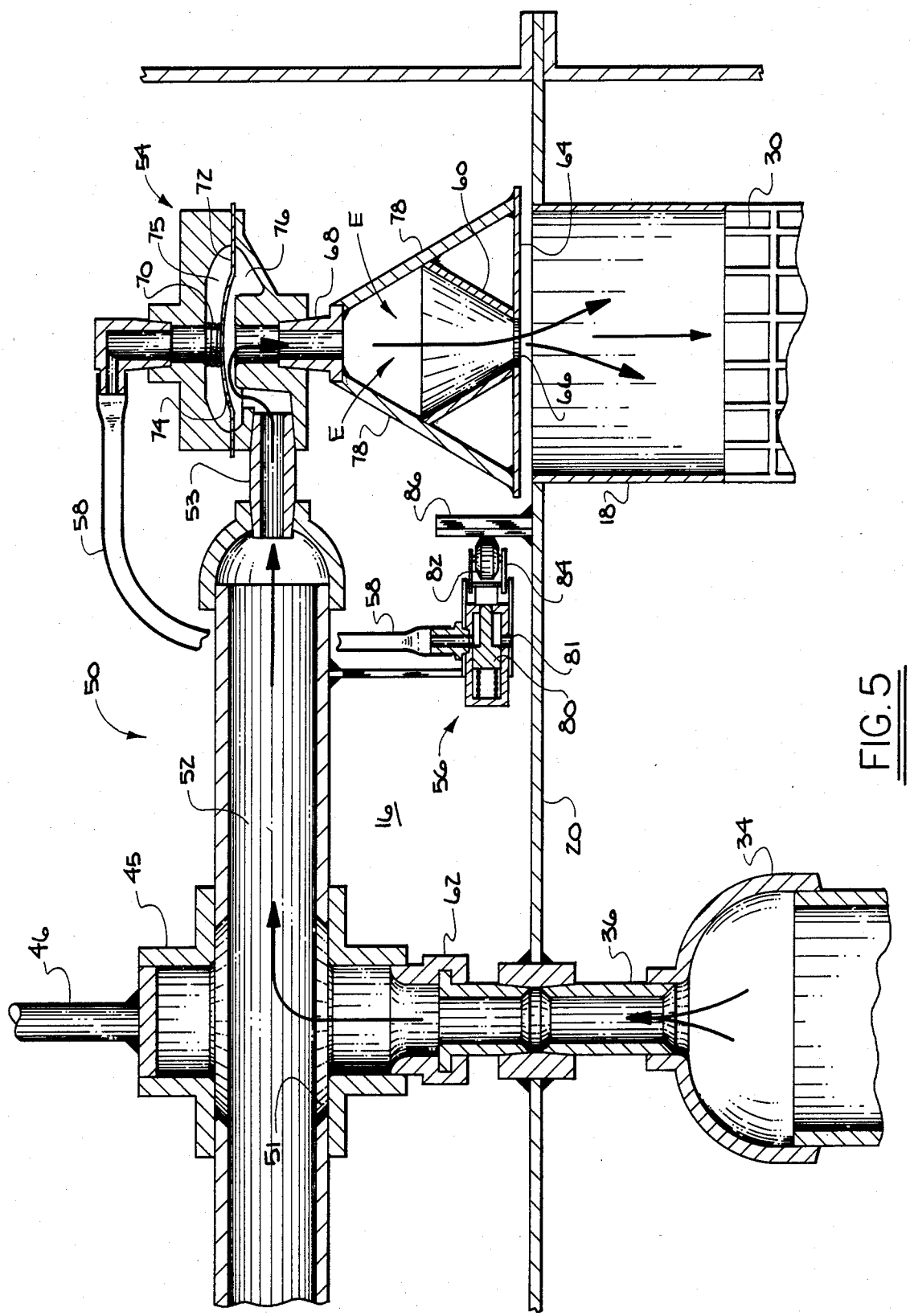
FIG. 5 is similar to FIG. 4 except the diaphragm valve is open with a high velocity blast of air passing into the filter bag.

Referring to the drawing in greater detail, the cylindrical baghouse is generally recognized by reference numeral 10, which comprises a cylindrical wall 13 joined with a lower conical secton 14 and conventional air lock 15. The dust-laden air enters inlet port 22 flowing into the dirty air plenum 12. Separating the clean air plenum 16 from the dirty air plenum 12 is a tube sheet or partition 20 which supports a plurality of filter bags 26. Attached to the tube sheet 20 are a plurality of flanged openings 18 which in turn support a wire cage 30, as seen in FIG. 5. Snugly fitted around the cage 30 is the filter bag 28 which is a felt type fabric material. Commonly used bag materials are Dacron and polyester felts. The wire cages 30 provide the skeletal support for the filter bags since the filtering air flow is from the outside in. The clean air flows up through the center of bags 26 and enters the clean air plenum 16 exiting through discharge port 24. High pressure plant air in the 80–100 PSIG range enters the right side of the baghouse through a fitting 32 and passes to a centrally located tank or accumulator chamber 34 through a pneumatic hose 35. Tank 34 is supported by a center supply conduit 36 which in turn attaches to tube sheet 20. Also supported on the supply conduit 36 is the rotating cleaning arm 50 which is driven by a motor 40 through a drive shaft 46. Due to the very slow rotation speed of arm 50, a gear reducer 42 is provided on the output of motor 40. Rotating arm 50 is pivotally connected to the stationary supply conduit 36 by a swivel joint 62. The upper end of drive shaft 46 includes a flexible drive coupling 44, all of which passes through a bearing 48 in the top wall of the clean air plenum 16.

Figure 1:
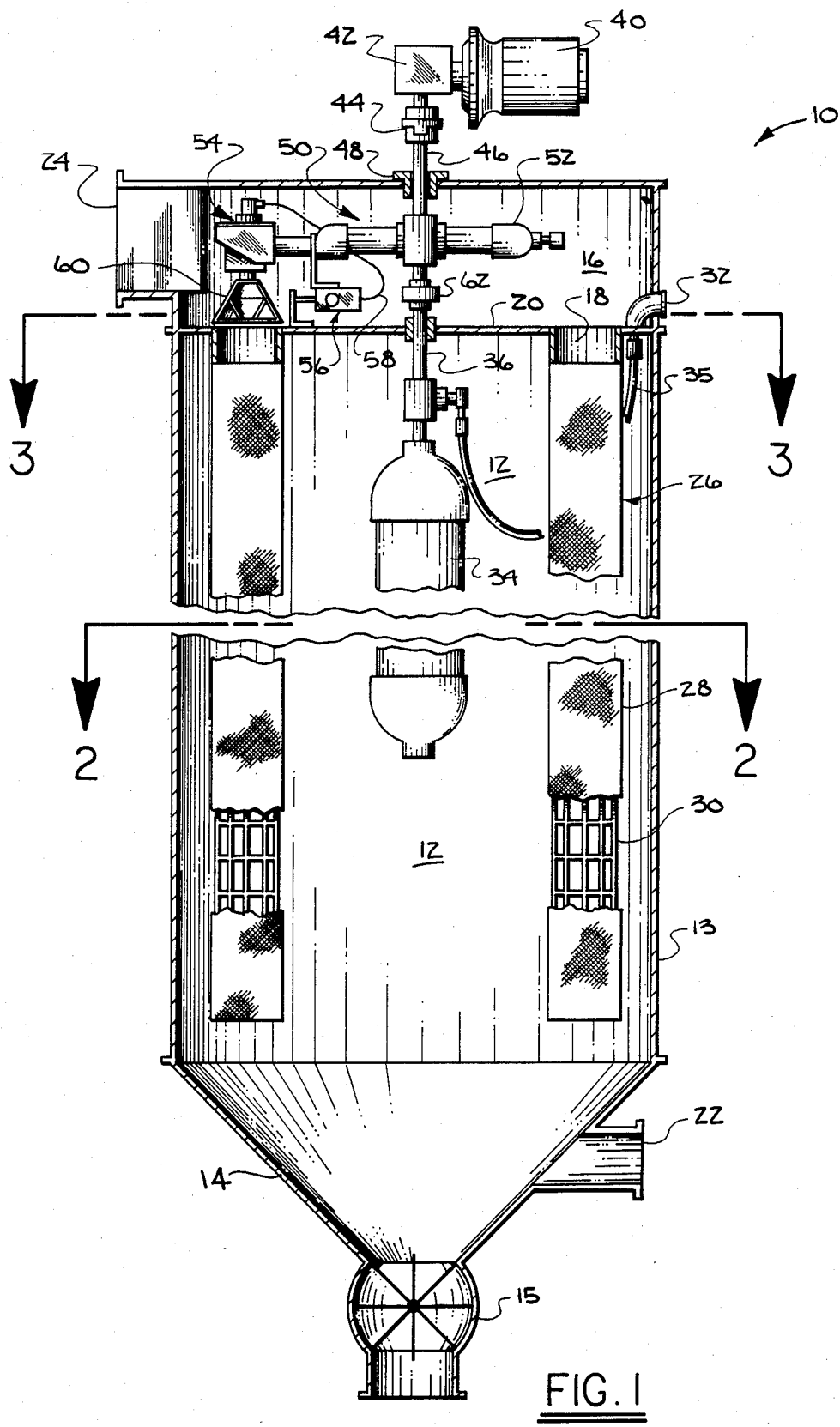
FIG. 1 is a side elevational view in longitudinal section of the baghouse with portions broken away to better illustrate the details of the construction.
Figure 2:
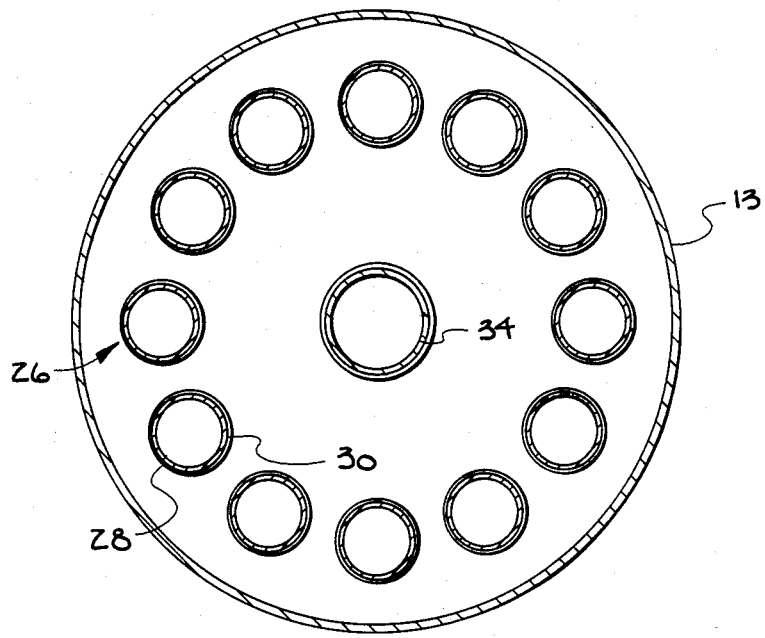
FIG. 2 is a sectional view taken along lines 2—2 of FIG. 1.
Figure 3:
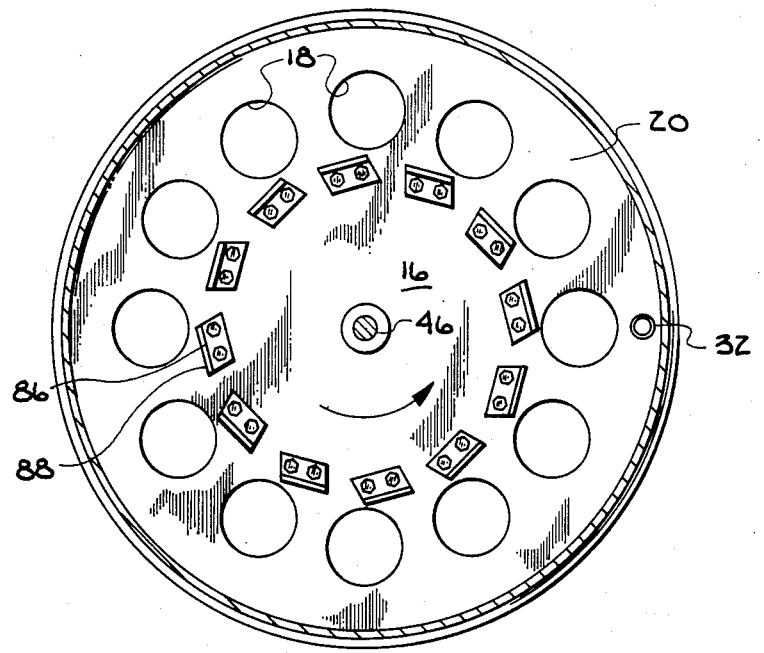
FIG. 3 is a sectional view taken along lines 3—3 of FIG. 1.
Figure 4:
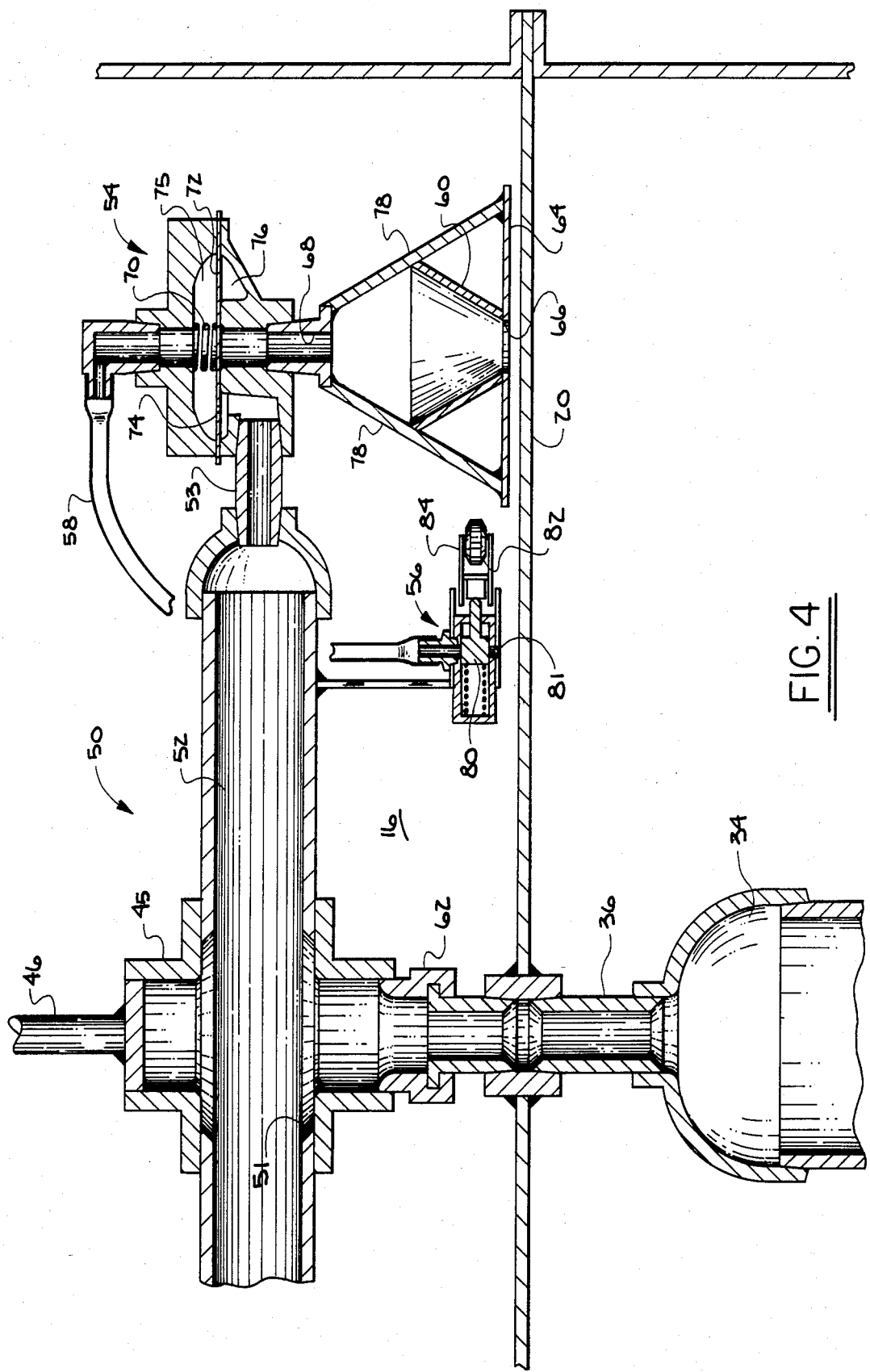
FIG. 4 is a fragmentary side sectional view to an enlarged scale taken along the center of the rotating arm, with the diaphragm valve in its closed position.

In viewing FIG. 4, the cleaning arm 50 is made up from a large diameter tube 52 having a lateral opening 51 for communication with accumulator tank 34. Located on the outer extremity of cleaning arm 50 is a pilot operated diaphragm valve 54 connected thereto by nipple 53. Valve 54 is similar in operation and structure to the valve illustrated in the above mentioned patent to Borst U.S. Pat. No. 4,247,310. A partition between upper chamber 75 and lower chamber 76 is a thin flexible diaphragm 72 which is normally held in its closed position by compression spring 70 as illustrated in FIG. 4. Located in diaphragm 72 is a small bleed opening 74 which allows the pressure on either side of diaphragm 72 to gradually equalize. To open valve 54 the pressure in upper chamber 75 must be bled to atmosphere. This is achieved by pilot valve 56 which connects to chamber 75 via a flexible pilot line 58. Pilot valve 56 includes a spring biased valve plunger 80 which blocks a vent passage 81 as illustrated in FIG. 4. A pivotally mounted actuator arm 84 which is spring biased against the end of plunger 80 carries a roller 82 which in turn engages a cam surface 86, as seen in FIGS. 3 and 5, for opening the pilot valve 56 which in turn opens the diaphragm valve 54 so that a high pressure blast of air can exit the valve 54 through a nozzle 68.

Positioned in concentric alignment below nozzle 68 is a converging venturi 60 having an opening 66 at its lower end which is larger in diameter than the nozzle 68. Also attached to the bottom surface of the venturi 60 is a circular closure plate 64 having a slightly greater diameter than the bag openings 18. Both the closure plate and venturi are held in position on nozzle 68 by a pair of thin support rods 78. As the rotating arm 50 swings the venturi 60 directly over a bag opening 18, cam 86 actuates pilot valve 56 thereby causing a high velocity blast of air to exit through nozzle 68 entering the bag through a venturi 60. The cam members 86 are best seen in FIG. 3. Roller 82 on the actuator arm 84 rides across cam 86 from left to right, as indicated by the arrow in FIG. 3, opening a pilot vent passage 81 at approximately the right edge of the cam. As the arm 50 moves further Roller 82 slips off the edge 88 of the cam and pilot valve plunger 81 is biased closed. As the pressure equalizes on both sides of diaphragm 72, spring 70 closes off the air flow through valve 54 and pressure again begins to build in an accumulator chamber 34. The cam members 86 as shown in FIG. 3 can be adjustably positioned on tube sheet 20 so that the particular opening timing and duration of the diaphragm valve 54 may be adjusted.

OPERATION

As the dust laden air enters the baghouse 10 through the inlet port 22 it flows upward in the dirty air plenum 12 passing through the fabric 28 of the filter bag. The dust accumulates and forms a cake on the exterior surface of the bag 26. The clean air flows upwardly through the center of the bags through openings 18 into the clean air chamber 16 and out the discharge port 24. Cleaning air for removal of the dust cake from the bags is provided through fitting 32 which attaches to a high pressure supply of plant air in a 80–100 PSIG range. The high pressure air is supplied to accumulator tank 34 via hose 35 which in turn fills large diameter pipe 52 and diaphragm chamber 76. Due to the opening 74 in diaphragm 72, pressure building in the inlet chamber 76 of the valve equally builds in the upper chamber 75, since the pilot valve 56 is closed. With pressure equalized on both sides of diaphragm 72 spring 70 retains diaphragm valve in its closed position regardless of the pressures experienced on the inlet side of valve 54.

At all times the filter is in operation, the cleaning arm 50 is likewise slowly revolving around the baghouse and back-washing each individual bag 26 at a variable time interval. A typical speed would swing the arm 50 over a bag opening every 10 seconds.

With the cleaning arm 50 rotating in the direction of the arrow in FIG. 3, the spring biased roller 82 would first engage the left edge of a cam member 86, as seen in FIG. 3 and then gradually depress plunger 80 as the roller moved across the inside surface of cam 86. Once plunger 80 is depressed sufficiently to vent passage 81, the pilot pressure in line 58 and upper chamber 75 immediately drops to 0 causing a differential across the diaphragm 72 which immediately snaps the diaphragm from its closed position in FIG. 4 to its opening position of FIG. 5. With valve 54 open the accumulated high pressure in accumulator tank 34 and tube 52 will rush out through nozzle 68 in a high velocity stream through the center of bag opening 18. This high velocity blast of air through venturi 60 causes stationary air surrounding nozzle 68 to be drawn in with the high velocity stream, as indicated by arrow E, and forced into the bag. A closure plate 64 positioned over the opening 18 substantially blocks the air within the bag so as to maximize the shocking effect of the air blast entering the bag. The high velocity blast of air entering the bag snaps the bag momentarily to its maximum diameter causing the dust cake which has accumulated on the exterior of the fabric to break free and fall by gravity to the lower section 13 of the dirty air plenum. After the initial shockwave hits the bag there is a time interval thereafter wherein the pressure in the bag bleeds off. There is a continuing backwash flow into the bag, causing additional dust particles to be separated from the bag surface. This backwash flow of air stops as the pilot valve plunger 80 closes vent passage 81 as roller 82 falls off the edge 88 of the cam as seen in FIG. 3. The rotating speed of cleaning arm 50 can be varied as can the time interval diaphragm valve 54 is open.

Having fully described my invention with sufficient clarity to enable those skilled in the art to construct and use it, I claim:

1. A gas filtering apparatus for separating particulate matter from air comprising:

a cylindrical housing having dirty air and clean air plenum chambers;

a substantially horizontal circular partition in the housing separating the dirty and clean air chambers having a plurality of circular bag openings therein;

a plurality of radially spaced longitudinally extending filter bags attached to the partition openings; each having a substantially unrestricted mouth therein;

an inlet port connected to the dirty air chamber for receiving the particulate laden air;

a discharge port in the clean air chamber for discharging the clean air;

a rotating cleaning arm, pivotally mounted within the clear air chamber to rotate over the bag openings in the partition;

a source of high pressure air connected to said arm;

a nozzle means attached to the high pressure source and positioned on the arm to direct a reverse flow high velocity jet of air into said partition openings;

pilot operated valve means on the arm for momentarily opening the flow of high pressure air through the nozzle means into each of the partition openings; a converging venturi means attached to the arm in axial spaced apart alignment with the nozzle means;

a closure plate means attached to the arm which substantially covers a partition opening when axially aligned therewith whereby the high velocity jet and the entrained air are momentarily retained within the bag;

means for rotating the cleaning arm; and cam means for actuating the valve means as the cleaning arm passes over each of the partition openings.

2. A gas filtering apparatus as set forth in claim 1, wherein the nozzle, venturi and closure plate are all concentrically aligned with the partition opening when the valve means is open.

3. A gas filtering apparatus as set forth in claim 1, wherein the nozzle, venturi and closure plate are all concentrically aligned with the partition opening when the valve means is open and the closure plate is attached to the smaller end of the venturi means.

4. A gas filtering apparatus as set forth in claim 1, wherein the venturi is a converging conical surface wherein the opening at the smaller end is at least twice the diameter of the nozzle means.

5. A gas filtering apparatus as set forth in claim 1, wherein the venturi is a converging conical surface beginning at the larger end with a diameter which is approximately three times that of the opening at the smaller end and the smaller end diameter is at least twice the diameter of the nozzle means.

6. A gas filtering apparatus as set forth in claim 1, wherein the venturi means is positioned an axial distance from the nozzle means to allow a substantial amount of outside air to be entrained by the high velocity jet into the partition opening.

7. A gas filtering apparatus as set forth in claim 1, wherein the venturi is a converging conical surface beginning at the larger end with a diameter which is approximately three times that of the opening at the smaller end and the smaller end diameter is at least twice the diameter of the nozzle means, and the axial distance between the nozzle means and the large end of the venturi is substantially the same as the diameter of the large end.

8. A gas filtering apparatus as set forth in claim 1, including an air accumulator chamber positioned upstream of the valve means.

9. A gas filtering apparatus as set forth in claim 8, wherein the accumulator chamber comprises the interior of the rotating arm.

10. A gas filtering apparatus as set forth in claim 1, including an air accumulator chamber positioned upstream of the valve means and centrally positioned with the dirty air plenum.

* * * * *